(12) United States Patent
Baba et al.

(10) Patent No.: US 12,401,102 B2
(45) Date of Patent: Aug. 26, 2025

(54) BATTERY PACK AND ELECTRIC VEHICLE

(71) Applicant: MURATA MANUFACTURING CO., LTD., Kyoto (JP)

(72) Inventors: Makoto Baba, Kyoto (JP); Takao Okuyama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 512 days.

(21) Appl. No.: 17/939,083

(22) Filed: Sep. 7, 2022

(65) Prior Publication Data

US 2023/0043802 A1 Feb. 9, 2023

Related U.S. Application Data

(63) Continuation of application No. PCT/JP2021/008755, filed on Mar. 5, 2021.

(30) Foreign Application Priority Data

Mar. 13, 2020 (JP) ................................. 2020-043758

(51) Int. Cl.
| | |
|---|---|
| *H01M 50/583* | (2021.01) |
| *B60L 50/64* | (2019.01) |
| *B60L 58/18* | (2019.01) |
| *H01M 10/48* | (2006.01) |
| *H01M 50/584* | (2021.01) |
| *H02J 7/00* | (2006.01) |

(52) U.S. Cl.
CPC .......... *H01M 50/583* (2021.01); *B60L 50/64* (2019.02); *B60L 58/18* (2019.02); *H01M 10/48* (2013.01); *H02J 7/00302* (2020.01); *H02J 7/0031* (2013.01); *H01M 2220/20* (2013.01)

(58) Field of Classification Search
CPC .... H01M 50/50; H01M 50/583; H01M 50/18; H01M 10/48
See application file for complete search history.

(56) References Cited

U.S. PATENT DOCUMENTS

| | | | |
|---|---|---|---|
| 2009/0273314 A1 | 11/2009 | Yoshikawa | |
| 2013/0143101 A1 | 6/2013 | Nakagawa et al. | |
| 2018/0248161 A1* | 8/2018 | Yoshida | ............... H01M 10/441 |

FOREIGN PATENT DOCUMENTS

| | | |
|---|---|---|
| JP | 2009273208 A | 11/2009 |
| WO | 2012014350 A1 | 2/2012 |

OTHER PUBLICATIONS

Japanese Office Action issued Oct. 3, 2023 in corresponding Japanese Application No. 2022-507145.
International Search Report of corresponding PCT application PCT/JP2021/008755, dated May 11, 2021.

* cited by examiner

*Primary Examiner* — Kenneth J Douyette
(74) *Attorney, Agent, or Firm* — K&L Gates LLP

(57) ABSTRACT

Provided is a battery pack including a pair of output terminals, a control unit, and a plurality of battery units, where each of the plurality of battery units includes a plurality of battery blocks connected in series, a positive electrode terminal, and a negative electrode terminal, the battery block includes one battery or a plurality of batteries connected in parallel, a fuse is connected between at least one output terminal of the pair of output terminals and a positive electrode terminal or a negative electrode terminal corresponding to the one output terminal, and the fuse is allowed to be fused by the control unit.

10 Claims, 8 Drawing Sheets

US 12,401,102 B2

BATTERY PACK AND ELECTRIC VEHICLE

TECHNICAL FIELD

The present invention relates to a battery pack and an electric vehicle.

BACKGROUND ART

In recent years, secondary batteries have been expanding in application. For example, lithium ion secondary batteries, which are typical examples of secondary batteries, have been expanding in application not only to various electronic devices but also to automobiles, motorcycles, electric flight vehicles, and the like. Depending on the application, not one (single cell) but a plurality of lithium ion secondary batteries may be used. When a plurality of lithium ion secondary batteries are used, an abnormality such as an internal short circuit may be caused in a predetermined battery of the lithium ion secondary batteries. Patent Document 1 below describes a battery module in which a lithium ion secondary battery with such an abnormality caused is separated in a circuit sense with the use of a fuse so as to secure safety.

PRIOR ART DOCUMENT

Patent Document

Patent Document 1: International Publication No. WO 2012/014350

SUMMARY OF THE INVENTION

Problem to be Solved by the Invention

The technique described in Patent Document 1 fails, however, to control the timing at which the fuse is fused, and thus has the possibility of failing to separate, in a circuit sense, the lithium ion secondary battery with an abnormality caused.

Accordingly, an object of the present invention is to provide a battery pack and an electric vehicle that allow a fuse to be fused at an appropriate timing to allow a secondary battery with an abnormality caused to be reliably separated in a circuit sense.

Means for Solving the Problem

The present invention provides a battery pack including a pair of output terminals, a control unit, and a plurality of battery units, where each of the plurality of battery units includes a plurality of battery blocks connected in series, a positive electrode terminal, and a negative electrode terminal, the battery block includes one battery or a plurality of batteries connected in parallel, a fuse is connected between at least one output terminal of the pair of output terminals and a positive electrode terminal or a negative electrode terminal corresponding to the one output terminal, and the fuse is allowed to be fused by the control unit.

Advantageous Effect of the Invention

According to at least an embodiment of the present invention, the fuse can be fused at an appropriate timing, thus allowing a secondary battery with an abnormality caused to be reliably separated in a circuit sense. It is to be noted that the contents of the present invention are not to be construed as being limited by the effects illustrated in this specification.

MODE FOR CARRYING OUT THE INVENTION

Hereinafter, embodiments and the like of the present invention will be described with reference to the drawings. It is to be noted that the description will be provided in the following order.
<Problems to be Considered in Embodiment>
<Embodiment>
<Modification Example>
<Application Example>
The embodiment and the like described below are preferred specific examples of the present invention, and the contents of the present invention are not to be considered limited to the embodiments and the like.

Problems to be Considered in Embodiment

Figure 1:
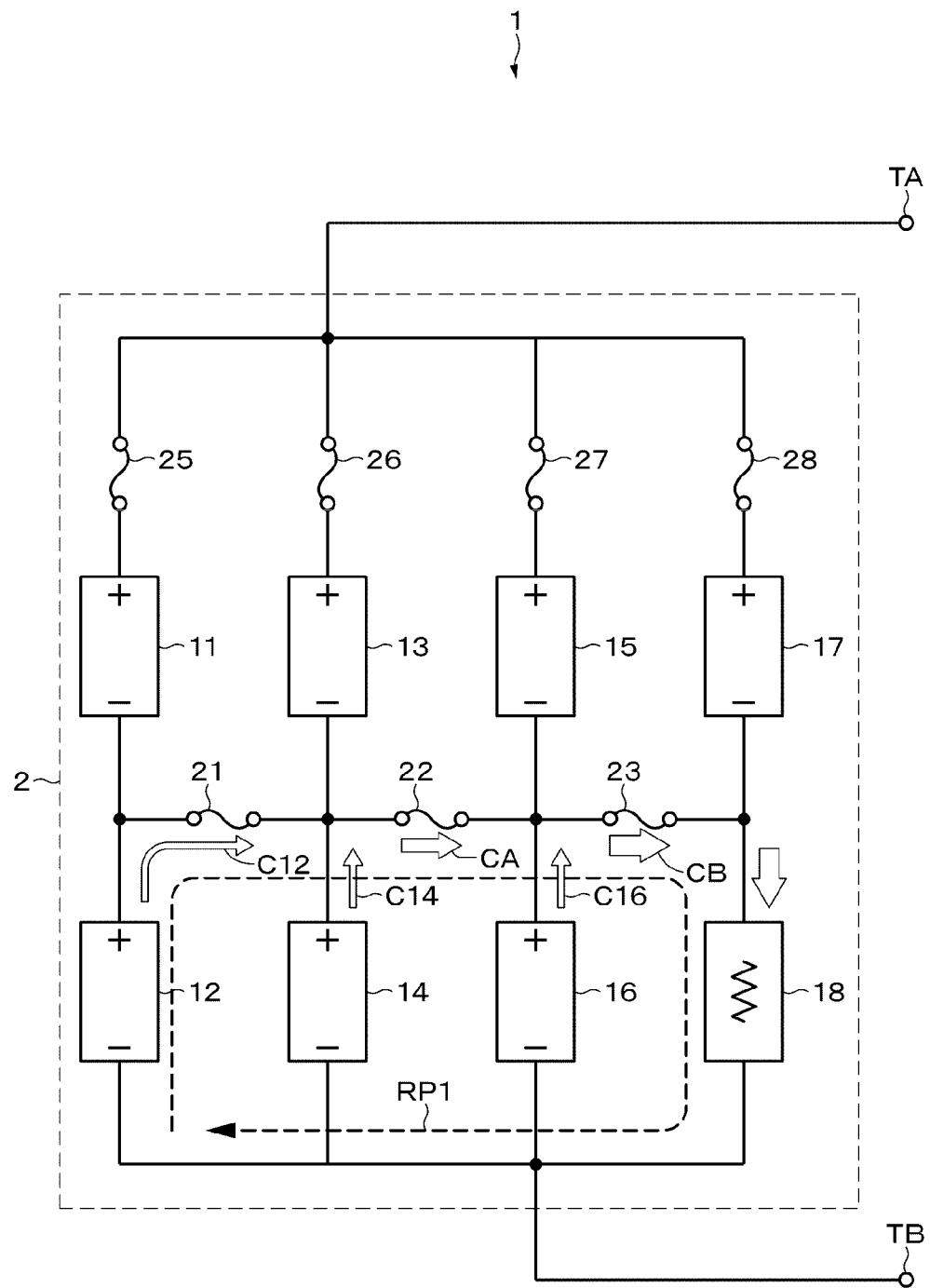
FIG. 1 is a diagram referred to in the description of problems to be considered in an embodiment.

First, for facilitating understanding of the present invention, problems to be considered in an embodiment will be described.
FIG. 1 is a diagram illustrating a configuration example of a common battery pack (battery pack 1). It is to be noted that the arrows illustrated in FIG. 1 schematically illustrate the flows of currents, and the thicknesses thereof indicate the magnitudes of the currents. The thicker arrow indicates a larger current, whereas the thinner arrow indicates a smaller current.
The battery pack 1 includes a battery section 2, a positive electrode terminal TA led out from the positive electrode side of the battery section 2, and a negative electrode terminal TB led out from the negative electrode side of the battery section 2.
The battery section 2 includes, for example, eight secondary batteries and seven fuses. The secondary battery is, for example, a single cell (hereinafter, simply referred to as a battery.) of a lithium ion secondary battery. The battery 11 and the battery 12 are connected in series, the battery 13 and the battery 14 are connected in series, the battery 15 and the battery 16 are connected in series, and battery 17 and battery 18 are connected in series.
The connection midpoint between the battery 11 and the battery 12 and the connection midpoint between the battery 13 and the battery 14 are connected via the fuse 21. In addition, the connection midpoint between the battery 13 and the battery 14 and the connection midpoint between the battery 15 and the battery 16 are connected via the fuse 22. In addition, the connection midpoint between the battery 15 and the battery 16 and the connection midpoint between the battery 17 and the battery 18 are connected via the fuse 23.

The fuse 25 is connected between the positive electrode terminal TA and the positive electrode side of the battery 11. The fuse 26 is connected between the positive electrode terminal TA and the positive electrode side of the battery 13. The fuse 27 is connected between the positive electrode terminal TA and the positive electrode side of the battery 15. The fuse 28 is connected between the positive electrode terminal TA and the positive electrode side of the battery 17.

In this regard, an example in which the battery 18 is internally short-circuited is considered. The internal short-circuit causes a short-circuit current to flow. Specifically, currents discharged from the battery 12, the battery 14, and the battery 16 flows through a loop RP1 on the lower stage side of the battery section 2 as illustrated in FIG. 1. The current C12 discharged from the battery 12 passes through the fuse 21, and then, is combined with the current C14 discharged from the battery 14 to become a current CA. The current CA passes through the fuse 22, and then, is combined with the current C16 discharged from the battery 16 to become a current CB. The current CB flows through the fuse 23.

The current flowing through the fuse 23 is larger than the current flowing through each of the fuse 21 and the fuse 22 (for simplification, the current flowing through the fuse 23 is three times as large as the current flowing through the fuse 21). Thus, as illustrated in FIG. 2, the fuse 23 is fused prior to the fuse 21 and the fuse 22.

Figure 2:
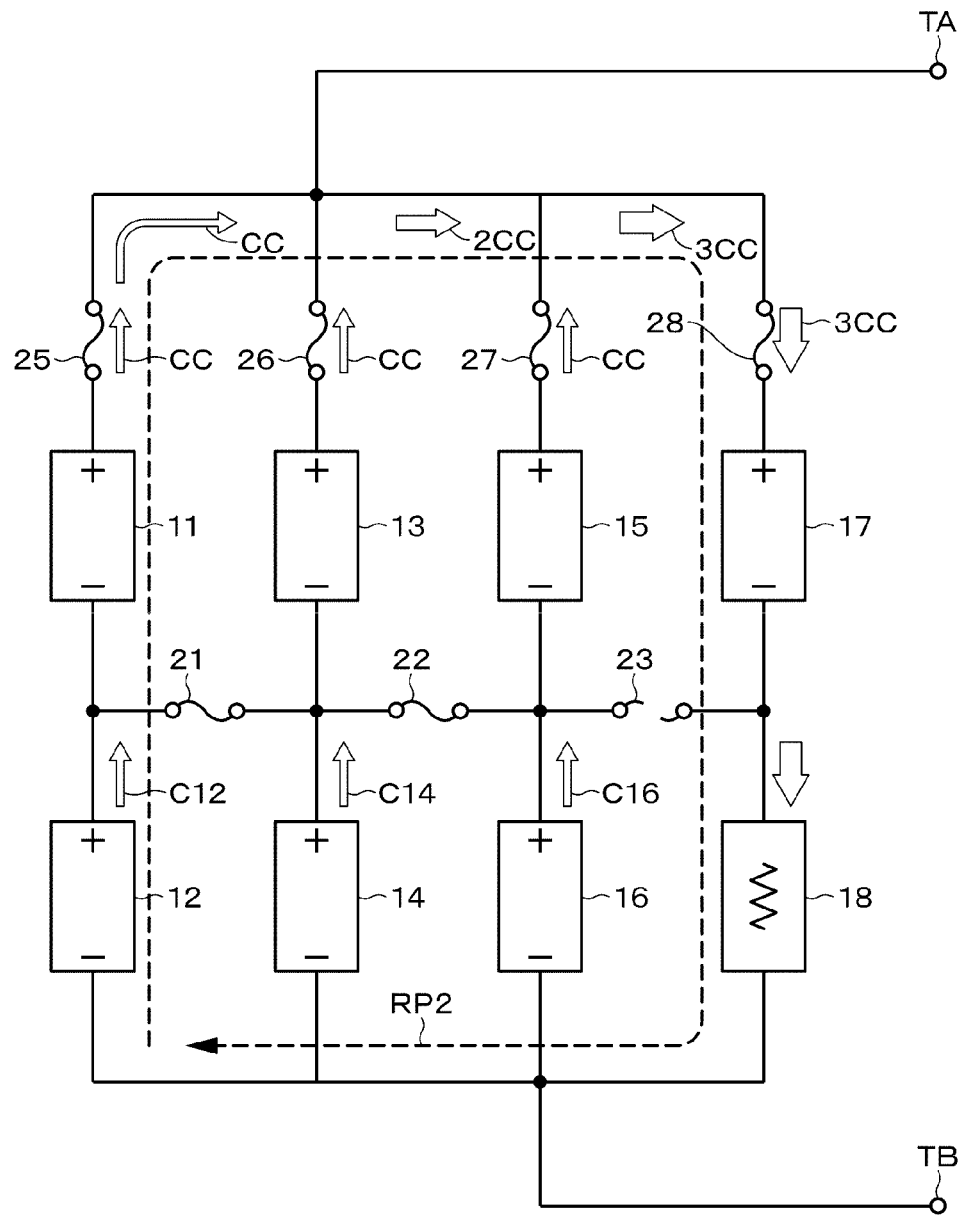
FIG. 2 is a diagram referred to in the description of problems to be considered in an embodiment.
Figure 3:
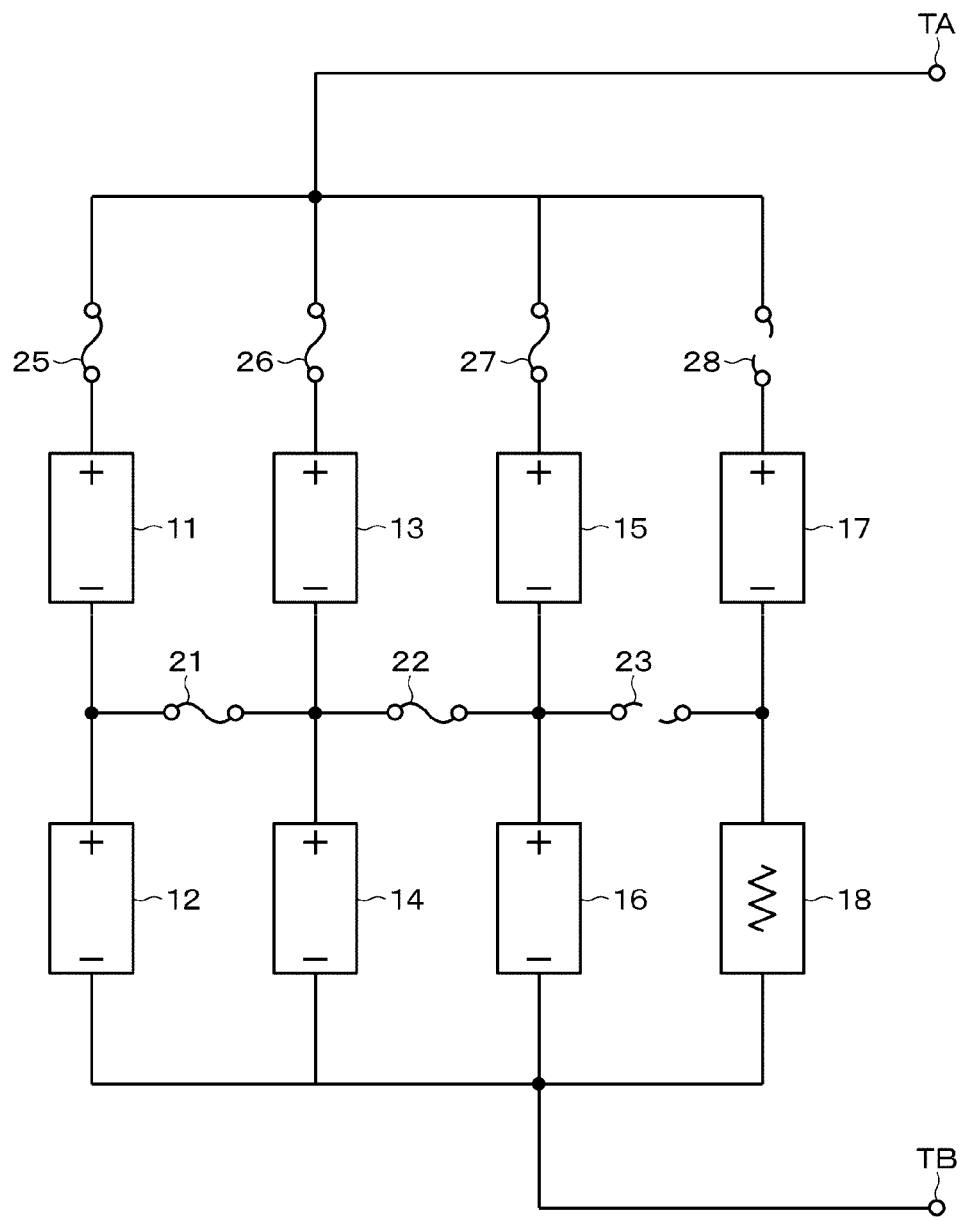
FIG. 3 is a diagram referred to in the description of problems to be considered in an embodiment.

Thereafter, as illustrated in FIG. 2, the currents discharged from the batteries 11 to 16 flow through a loop RP2 of the battery section 2. The currents (current CC) flowing through the fuse 25, the fuse 26, and the fuse 27 are substantially equal in magnitude. In contrast, the current flowing through the fuse 28 is a current 3CC obtained by combining the currents flowing through each of the fuse 25, the fuse 26, and the fuse 27. Thus, as illustrated in FIG. 3, the fuse 28 is fused prior to each of the fuse 25, the fuse 26, and the fuse 27. As a result, the battery 18 internally short-circuited is separated as an open circuit, that is, in a circuit sense in the battery pack 1. Accordingly, the battery 18 is not allowed to be charged or discharged, thus allowing the battery 18 to be prevented from generating heat or being ignited, and allowing the safety of the battery pack 1 to be secured.

It is to be noted that if the battery other than the battery 18 is internally short-circuited, the safety of the battery pack 1 is similarly secured.

Figure 4:
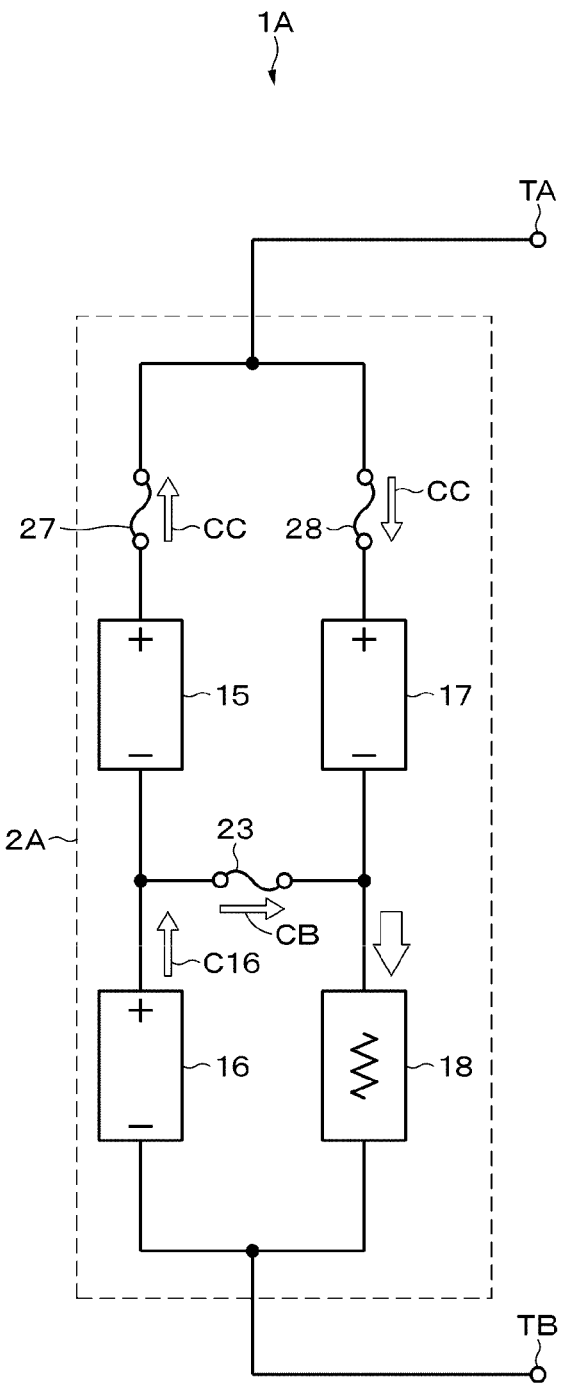
FIG. 4 is a diagram referred to in the description of problems to be considered in an embodiment.

FIG. 4 is a diagram illustrating a configuration example of a battery pack (battery pack 1A) according to another example of a common battery pack. The battery pack 1A differs from the battery pack 1 in terms of configuration in that the battery pack 1A has a battery section 2A instead of the battery section 2. The battery section 2A includes the above-described batteries 15 to 18, and fuse 23, fuse 27, and fuse 28 (each configuration has the same connection relationship as that in the battery section 2).

An example in which the battery 18 is internally short-circuited is considered. As illustrated in FIG. 4, after fuse 23 is fused by a current C16 discharged from the battery 16, a current CC discharged from the battery 15 and the battery 16 also flows through the fuse 28 via the fuse 27.

The currents flowing through the fuse 27 and the fuse 28 are equal in magnitude. For this reason, which of the fuse 27 and the fuse 28 is fused first is not known. For example, if the fuse 27 is fused prior to the fuse 28, the battery 18 internally short-circuited fails to be separated in a circuit sense, thus causing a problem that the battery 18 continues to be charged and discharged. It is not possible to predict which battery is internally short-circuited, and it is thus practically impossible to make only a specific fuse into a fuse that has a characteristic of being likely to be fused. Accordingly, it is desirable to be capable of controlling the timing of fusing the fuse. In addition, for example, as in the circuit illustrated in FIG. 4, when the number of series-connected battery groups connected in parallel is two, it is desirable to be capable of controlling the timing of fusing the fuse connected to each of the battery groups. An embodiment of the present invention will be described in view of the foregoing respects.

Embodiment

Definitions of Terms Used in this Specification

First, the definitions of terms used in this specification will be described.

"Battery" . . . means a so-called single battery (single cell). It is to be noted that a single cell of a lithium ion secondary battery will be described as an example of the battery in the present embodiment, other batteries may be employed.

"Battery block" . . . means a block including one battery or a plurality of batteries connected in parallel.

"Battery unit" . . . means a unit that has a plurality of battery blocks connected in series. Each of different battery units has the same number of battery blocks.

"Battery section" . . . means a configuration including a plurality of battery units.

[Battery Pack According to Present Embodiment]
(Schematic Configuration)

Figure 5:
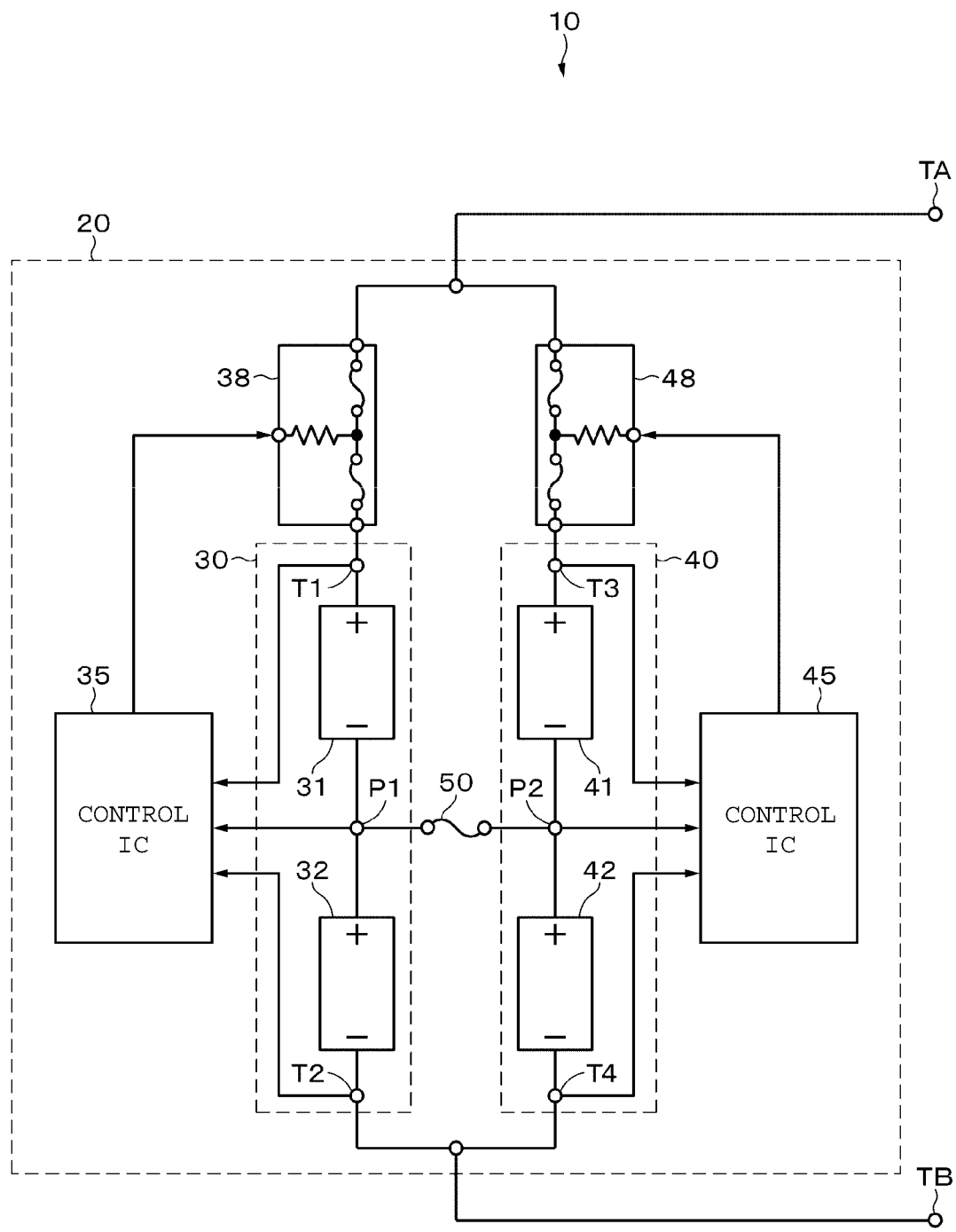
FIG. 5 is a diagram illustrating a schematic configuration example of a battery pack according to an embodiment.

FIG. 5 is a diagram illustrating a schematic configuration example of a battery pack (battery pack 10) according to the present embodiment. The battery pack 10 includes a battery section 20. A positive electrode terminal TA is led out from the positive electrode side of the battery section 20. A negative electrode terminal TB is led out from the negative electrode side of the battery section 20. The positive electrode terminal TA and the negative electrode terminal TB correspond to a pair of output terminals.

The battery pack 10 includes a battery unit 30, a control integrated circuit (IC) 35, a heater fuse 38, a battery unit 40, a control IC 45, a heater fuse 48, and a fuse 50. The configuration including the battery unit 30 and the heater fuse 38 and the configuration including the battery unit 40 and the heater fuse 48 are connected in parallel. It is to be noted that according to the present embodiment, each of the control IC 35 and the control IC 45 corresponds to a control unit.

The battery unit 30, which is an example of the first battery unit, has the form of a battery block 31 and a battery block 32 connected in series. Specific configuration examples of the battery block 31 and battery block 32 will be described later. In addition, the battery unit 30 has a positive electrode terminal T1 and a negative electrode terminal T2.

The control IC 35 is connected to the battery unit 30 and the heater fuse 38. The control IC 35 determines the state of each of the battery block 31 and battery block 32. For example, the control IC 35 measures the voltage for each of the battery block 31 and battery block 32, and determines whether each battery block is overcharged or not. Then, if there is any battery block overcharged, the control IC 35 controls the current to the heater of the heater fuse connected in series to the battery block, that is, the heater fuse 38. This control allows the heater fuse 38 to be fused.

The heater fuse 38 is connected between the positive electrode terminal TA, which is one of the pair of output terminals, and the positive electrode terminal corresponding to the positive electrode terminal TA, that is, between the positive electrode terminal TA and a positive electrode terminal T1 of the battery unit 30 on the same polarity side. The heater fuse 38 is allowed to be fused in accordance with the control of the control IC 35.

The battery unit 40, which is an example of the second battery unit, includes a battery block 41 and a battery block 42 connected in series. Specific configuration examples of the battery block 41 and battery block 42 will be described later. In addition, the battery unit 40 has a positive electrode terminal T3 and a negative electrode terminal T4.

The control IC 45 is connected to the battery unit 40 and the heater fuse 48. The control IC 45 determines the state of each of the battery block 41 and battery block 42. For example, the control IC 45 measures the voltage for each of the battery block 41 and battery block 42, and determines whether each battery block is overcharged or not. Then, if there is any battery block overcharged, the control IC 45 controls the current to the heater of the heater fuse connected in series to the battery block, that is, the heater fuse 48. This control allows the heater fuse 48 to be fused.

The heater fuse 48 is connected between the positive electrode terminal TA, which is one of the pair of output terminals, and the corresponding positive electrode terminal, that is, between the positive electrode terminal TA and a positive electrode terminal T3 of the battery unit 40 on the same polarity side. The heater fuse 48 is allowed to be fused in accordance with the control of the control IC 35.

The fuse 50 is another fuse that is different from the heater fuse 38 and the heater fuse 48. As the fuse 50, a common fuse such as a current fuse can be applied. The connection midpoints of the battery blocks in each of the different battery units are connected to each other via the fuse 50. Specifically, the connection midpoint P1 between the battery block 31 and the battery block 32 in the battery unit 30 and the connection midpoint P2 between the battery block 41 and the battery block 42 in the battery unit 40 are connected via the fuse 50. It is to be noted that the connection midpoint in the present specification refers to an arbitrary position in a connection path in a circuit sense, which is not necessarily required to be the center in the connection path.

(In Regard to Heater Fuse)

Figure 6A:
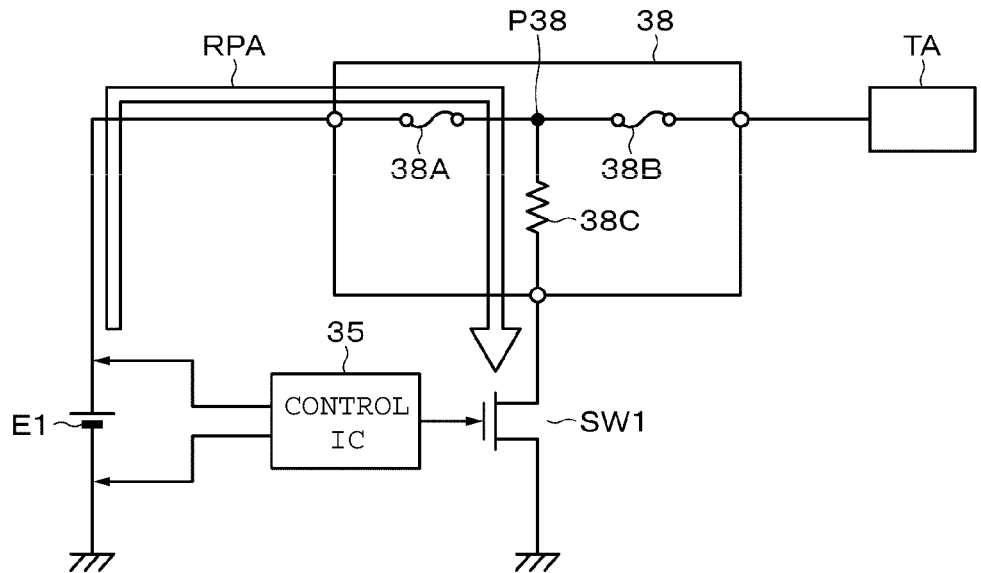
FIGS. 6A and 6B are diagrams illustrating a configuration example of a heater fuse according to an embodiment.

Next, an example of the heater fuse will be described. As illustrated in FIG. 6A, the heater fuse 38 includes two fuses 38A and 38B connected in series between the positive electrode terminal TA and the positive electrode terminal T1, and a heater 38C that has one end side connected to a connection midpoint P38 between the fuses 38A and 38B. The heater 38C is a heat generator such as a resistance heater.

The fuse 38A has one end side (side opposite to the connection midpoint P38) connected to the ground via a battery E1. In addition, the other end side of the heater 38C is connected to the ground via the switch SW1. The switch SW1 is a switch that is turned on/off by the control IC 35, and is provided near the heater fuse 38. The battery E1 is, for example, a battery block overcharged (details will be described later).

Normally, the switch SW1 is turned off. When there is a need to fuse the fuse 38A and the fuse 38B, the control IC 35 performs control to operate the heater fuse 38. Specifically, the switch SW1 is turned on by the control IC 35. When the switch SW1 is turned on, a current flows through a current loop RPA in FIG. 6A. The control performed by the control IC 35 to cause the current to flow causes a current to flow through the heater 38C, thereby causing the heater 38C to generate heat. The fuse 38A and the fuse 38B are fused by the heat. As described above, the heater fuse 38 is a device that is capable of, as with a normal current fuse or the like, fusing due to an excessive current flowing through the fuse, and also causing a current to flow through the heater 38C to fuse the fuse 38A and the fuse 38B at a predetermined timing.

Figure 6B:
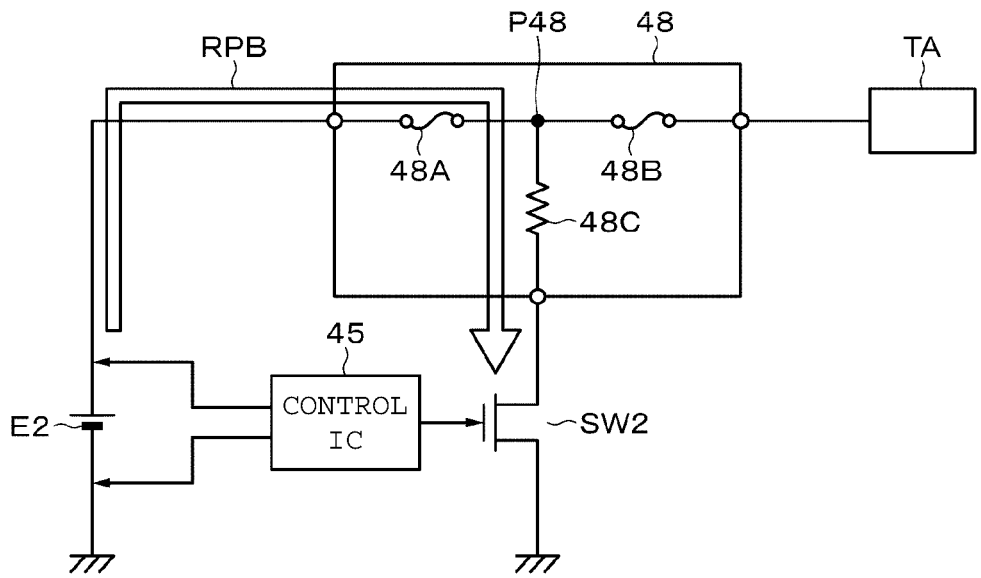

As illustrated in FIG. 6B, the heater fuse 48 includes two fuses 48A and 48B connected in series between the positive electrode terminal TA and the positive electrode terminal T3, and a heater 48C that has one end side connected to a connection midpoint P48 between the fuses 48A and 48B. The heater 48C is a heat generator such as a resistance heater.

The fuse 48A has one end side (side opposite to the connection midpoint P48) connected to the ground via a battery E2. The other end side of the heater 48C is connected to the ground via the switch SW2. The switch SW2 is a switch that is turned on/off by the control IC 45, and is provided near the heater fuse 48. The battery E2 is, for example, a battery block overcharged (details will be described later).

Normally, the switch SW2 is turned off. When there is a need to fuse the fuse 48A and the fuse 48B, the control IC 45 performs control to operate the heater fuse 48. Specifically, the switch SW2 is turned on by the control IC 45. When the switch SW2 is turned on, a current flows through a current loop RPB in FIG. 6B. The control performed by the control IC 45 to cause the current to flow causes a current to flow through the heater 48C, thereby causing the heater 48C to generate heat. The fuse 48A and the fuse 48B are fused by the heat. As described above, the heater fuse 48 is a device that is capable of, as with a normal current fuse or the like, fusing due to an excessive current flowing through the fuse, and also causing a current to flow through the heater 48C to fuse the fuse 48A and the fuse 48B at a predetermined timing.

Detailed Configuration Example of Battery Pack According to Present Embodiment

Figure 7:
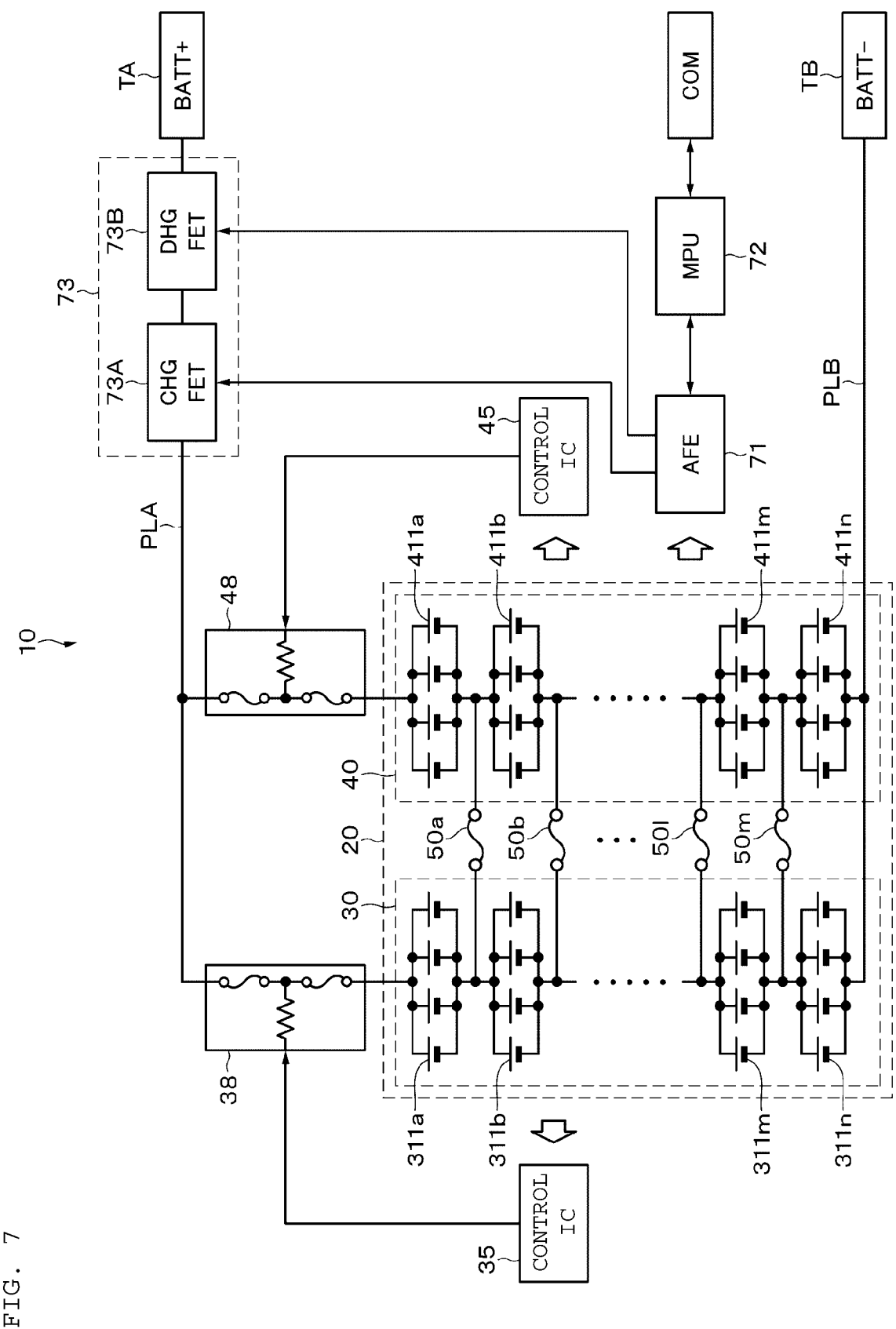
FIG. 7 is a diagram illustrating a detailed configuration example of a battery pack according to an embodiment.

FIG. 7 is a diagram illustrating a detailed configuration example of the battery pack 10 according to the present embodiment. The battery unit 30 includes, for example, fourteen battery blocks (battery block 311a, battery block 311b, . . . battery block 311n) connected in series. It is to be noted that when there is no need to distinguish the individual battery blocks, the battery blocks are appropriately abbreviated as battery blocks 311.

The battery block 311 has a configuration with four batteries connected in parallel. The number of batteries connected in parallel can be appropriately changed, but is appropriately set to the extent that the temperatures of the batteries are not equal to or higher than a certain level due to a short-circuit current generated when any of the batteries is internally short-circuited.

The battery unit 40 includes, for example, fourteen battery blocks (battery block 411a, battery block 411b, . . . battery block 411n) connected in series. It is to be noted that when there is no need to distinguish the individual battery blocks, the battery blocks are appropriately abbreviated as battery blocks 411.

The battery block 411 has a configuration with four batteries connected in parallel. The number of batteries connected in parallel can be appropriately changed, but is appropriately set to the extent that the temperatures of the batteries are not equal to or higher than a certain level due to a short-circuit current generated when any of the batteries is internally short-circuited.

The fuse 50 includes (the number of battery blocks—1) fuses, that is, thirteen fuses (fuse 50a, fuse 50b, . . . fuse 50m). For example, the connection midpoint between the battery block 311a and the battery block 311b and the connection midpoint between the battery block 411a and battery block 411b of the battery unit 40 are connected via the fuse 50a. The connection midpoints of the other battery blocks are similarly connected to each other via the fuses.

In addition, the battery pack 10 includes an AFE (Analog Front End) 71, an MPU (Micro Processing Unit) 72, and a charge/discharge control switch 73. The charge/discharge control switch 73 includes a charge control switch 73A and a discharge control switch 73B.

The AFE 71 is a type of protection IC, which measures the voltage of each battery block, and a charge current and a discharge current flowing through the circuit in the battery pack 10. Then, the AFE 71 transmits the measurement results to the MPU 72, which is an upper-level IC.

The MPU 72 comprehensively controls operations such as a protection operation of the battery pack 1. In addition, the MPU 72 communicates with an electronic device side (host side) to which the battery pack 10 is applied, via a communication terminal COM.

The charge/discharge control switch 73 is a switch whose on/off is controlled by the AFE 71. As the charge/discharge control switch 73, for example, an FET (Field Effect Transistor) can be used. The charge/discharge control switch 73 is connected in series to the positive electrode terminal TA and the heater fuse 38 or heater fuse 48 on a power line PLA on the positive electrode side.

Operation Example of Battery Pack (On/Off Control of Charge/Discharge Control Switch)

Next, an operation example of the battery pack 10 according to the present embodiment will be described. First, on/off control for the charge/discharge control switch 73 will be described.

As described above, the AFE 71 transmits, to the MPU 72, the voltage of each battery block, and the results of measuring the charge current and discharge current flowing through the circuit in the battery pack 10. The MPU 72 determines whether it is necessary to block the current path or not, based on the transmitted measurement results. If it is necessary to block the current path, the MPU 72 outputs a control command to the AFE 71. In response to the control command, the AFE 71 appropriately turns on/off the charge control switch 73A and the discharge control switch 73B, thereby blocking the current path.

For example, if the MPU 72 determines that the battery section 20 without any abnormality or the like can be charged and discharged without any problem, the MPU 72 controls the AFE 71 to turn on the charge control switch 73A and the discharge control switch 73B. In addition, the MPU72 controls the AFE 71 to turn off at least the charge control switch 73A when it is necessary to prohibit charging, for example, when the voltage of the battery section 20 reaches the overcharge prohibition voltage. In addition, the MPU72 controls the AFE 71 to turn off at least the discharge control switch 73B when it is necessary to prohibit discharging, for example, when the voltage of the battery section 20 reaches the overdischarge prohibition voltage. In addition, when the battery section 20 is deeply discharged to reach the recharge inhibition region, the MPU 72 controls the AFE 71 to turn off the charge control switch 73A and the discharge control switch 73B, thereby stopping the charging/discharging.

(Fusing Control for Heater Fuse)

Next, fusing control for the heater fuse 38 and the heater fuse 48 will be described. It is to be noted that in the following description, the configurations of the battery unit 30 and battery unit 40 illustrated in FIG. 5 will be taken as an example to describe the fusing control for the heater fuses in consideration of convenience of description. In addition, the description will be given on the assumption that the battery block 42 of the battery unit 40 is internally short-circuited.

After the battery block 42 is internally short-circuited, a current from the battery block 32 flows through the fuse 50, thereby fusing fuse 50. Then, a current from the battery unit 30 flows to the battery unit 40 via the heater fuse 38 and the heater fuse 48.

In this regard, when the heater fuse 48 is fused prior to the heater fuse 38, the battery block 42 internally short-circuited can be electrically separated. Accordingly, if a charge voltage is applied to the battery pack 1 via the positive electrode terminal TA and the negative electrode terminal TB, the safety of the battery pack 1 can be secured. In contrast, when the heater fuse 38 is fused prior to the heater fuse 48, the battery block 42 fails to be electrically separated. When the battery pack 1 is charged in this condition, the voltage of the battery block 42 is not increased because of the internal short circuit generated, and only the voltage of the battery block 41 is increased. The increased voltage of the battery block 41 brings the battery block 41 into an overcharged state (state in which the voltage is equal to or higher than the threshold value (for example, 4.3 V in the case of the battery)).

The overcharged state of the battery block 41 is detected by the control IC 45. The control IC 45 that has detected the overcharged state of the battery block 41 determines that it is necessary to operate the heater fuse 48 connected in series with the battery block 41 in the overcharged state. Then, the control IC 45 performs control to cause a current to flow through the heater fuse 48 (control to turn on the switch SW2 described above). This control allows a current to flow through the heater 48C with the use of the electric power of the battery block 41, thereby allowing the heat of the heater 48C to fuse the fuse 48A and the fuse 48B. Accordingly, the battery unit 40 including the battery block 42 can be electrically separated.

Similar processing is performed also if the battery block other than battery block 42 is internally short-circuited. For example, when the battery block 32 is internally short-circuited, and an overcharged state of the battery block 31 is then detected, the control IC 35 performs control to operate the heater fuse 38. In addition, similar processing is performed if any of the batteries constituting the battery block 311 and the battery block 411 is internally short-circuited.

Advantageous Effect

According to the present embodiment described above, for example, the following effects can be obtained.

The battery block internally short-circuited can be reliably electrically separated, thus allowing heat generation, ignition, and the like due to the internal short circuit of the battery block to be prevented, and allowing the safety of the battery pack to be secured.

In the specific example described above, when the heater fuse 48 is fused prior to the heater fuse 38, none of the battery blocks is brought into an overcharged state, and the control is thus not performed to fuse the heater fuse 38. Accordingly, the use of the battery unit 30 can be continued.

Modification Example

While the embodiments of the present invention have been concretely described above, the contents of the present invention are not to be considered limited to the embodiments described above, and it is possible to make various modifications based on technical idea of the present invention.

In the embodiment described above, the control IC may determine a state other than the overcharged state, thereby determining the necessity of operating the heater fuse. For example, the control IC may determine the state of the voltage balance between the battery blocks. When charging is performed, if the voltage of one of the battery blocks connected in series is increased, whereas the voltage of the other battery block is not substantially changed, the control IC may determine that it is necessary to operate the heater fuse because the other battery block is internally short-circuited. Without charging, when the voltage difference between the battery blocks is equal to or larger than a certain level, it may be determined that it is necessary to operate the heater fuse on the assumption that the battery block is internally short-circuited. This control allows the battery with an abnormality caused to be separated earlier. In addition, the control IC may determine the presence or absence of a battery block that undergoes no substantial change in voltage if charging is performed, and determine that it is necessary to operate the heater fuse if there is such a battery block. With these conditions combined, the control IC may determine whether it is necessary to operate the heater fuse or not.

The example of operating the heater fuse with the use of the electric power of the battery block in the overcharged state is described in the embodiment described above, but the invention is not to be considered limited to the example. For example, with a battery pack provided with a constant current source, the flow of a current from the constant current source to the heater of the heater fuse may cause the heater to generate heat. In addition, some or all of the plurality of heater fuses included in the battery pack may be connected between the negative electrode terminal of the battery pack and the negative electrode terminal of the battery unit. In addition, in preparation for operational failures of the heater fuses, the heater fuses may be connected both between the positive electrode terminal of the battery pack and the positive electrode terminal of the battery unit and between the negative electrode terminal of the battery pack and the negative electrode terminal of the battery unit.

In the embodiment described above, the AFE may autonomously determine the necessity of the protection operation, based on the measurement result of a voltage or the like, instead of the control by the MPU, and appropriately turn on/off the charge/discharge control switch in response to the determination result. In addition, the MPU may transmit the measurement result transmitted from the AFE, to the electronic device side, thereby causing a microcomputer on the electronic device side to determine the necessity of the protection operation.

In the embodiment described above, the control IC may communicate with the AFE or the MPU. For example, the control IC may communicate with the MPU, thereby causing the control IC to notify the MPU that a predetermined heater fuse has been fused. Then, the MPU may notify the user to prompt the replacement of the heater fuse, or may display or sound an error message or the like.

In the embodiment described above, the charge/discharge control switch may be connected in series with the negative electrode terminal TB and the heater fuse connected to the negative electrode side of the battery unit on the power line PLB on the negative electrode side. In addition, the configuration of the battery pack, such as the configuration of the control IC and AFE integrated, can be appropriately changed without departing from the scope of the present invention. In addition, the number of the battery units connected, the number of the battery blocks connected, the configurations of the battery blocks (the numbers of batteries and the connection modes), and the like in the embodiment described above can be appropriately changed.

The matters described in the above-described embodiments and modification examples can be appropriately combined. In addition, the materials, processes, and the like described in the embodiments are considered merely by way of example, and the contents of the present invention are not to be considered limited to the exemplified materials or the like.

Application Example

The battery packs 10 according to the present invention can be used for mounting on an electric tool, an electric vehicle, various electronic devices, or the like, or for supplying electric power thereto.

Figure 8:
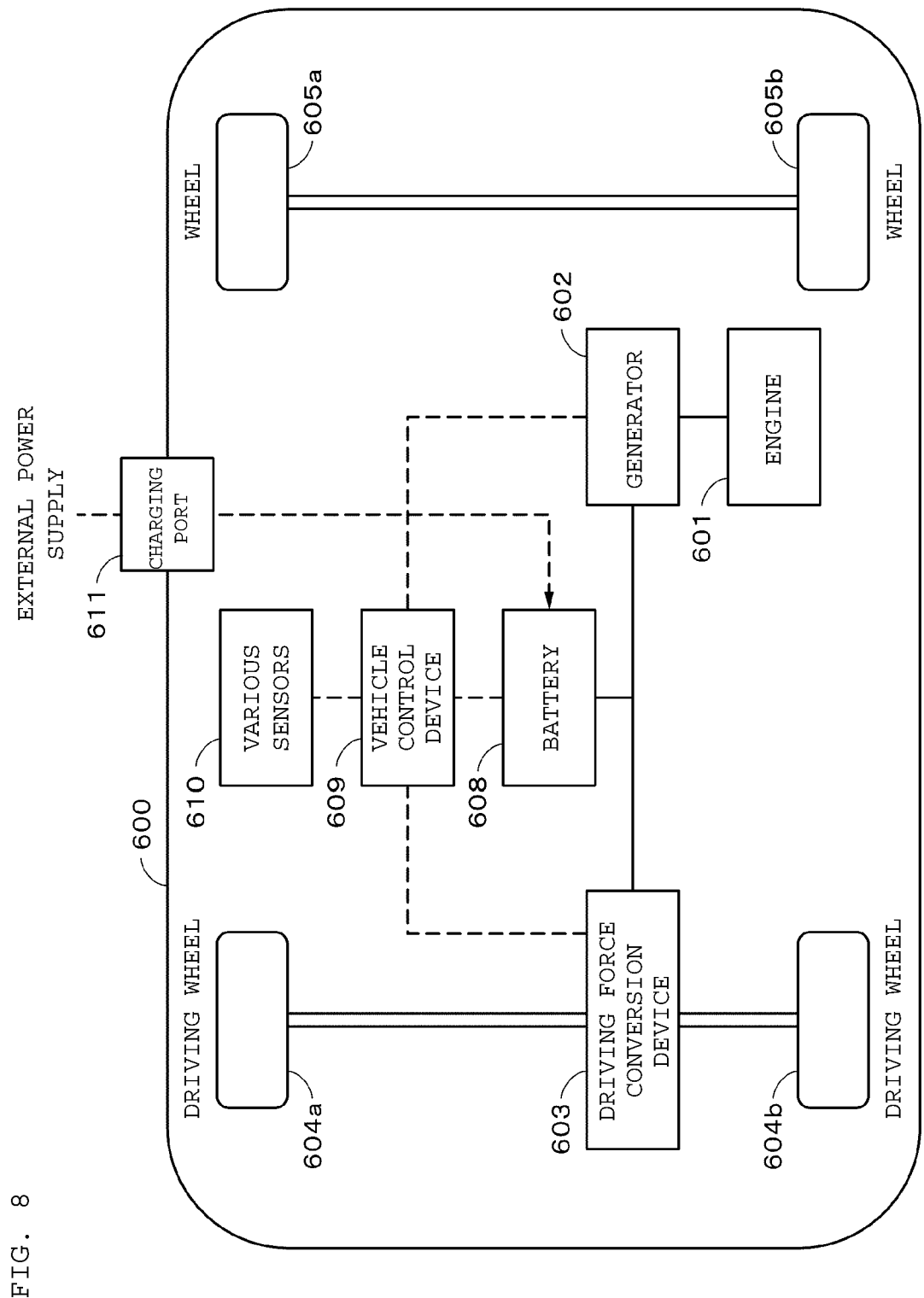
FIG. 8 is a diagram for explaining an application example.

FIG. 8 schematically illustrates a configuration example of a hybrid vehicle (HV) that employs a series hybrid system to which the present invention is applied, as an example of applying the present invention to an electric storage system for an electric vehicle. The series hybrid system is intended for a vehicle that runs on an electric power-driving force conversion device, with the use of electric power generated by a generator powered by an engine, or the electric power stored once in the battery.

The hybrid vehicle 600 carries an engine 601, a generator 602, the electric power-driving force conversion device (direct-current motor or alternate-current motor, hereinafter referred to simply as a "motor 603"), a driving wheel 604a, a driving wheel 604b, a wheel 605a, a wheel 605b, a battery 608, a vehicle control device 609, various sensors 610, and a charging port 611. As the battery 608, the battery pack 10 according to the present invention can be applied.

The motor 603 is operated by the electric power of the battery 608, and the torque of the motor 603 is transmitted to the driving wheels 604a and 604b. The torque produced by the engine 601 makes it possible to reserve, in the battery 608, the electric power generated by the generator 602. The various sensors 610 control the engine rotation speed via the vehicle control device 609, and control the position of a throttle valve, not shown.

When the hybrid vehicle 600 is decelerated by a braking mechanism, not shown, the resistance force during the deceleration is applied as torque to the motor 603, and the regenerative electric power generated by the torque is reserved in the battery 608. In addition, the battery 608 is connected to an external power supply through the charging port 611 of the hybrid vehicle 600, thereby making charge possible. Such an HV vehicle is referred to as a plug-in hybrid vehicle (PHV or PHEV).

It is to be noted that the secondary battery according to the present invention can also be applied to a downsized primary battery, and then used as a power supply for a pneumatic sensor system (TPMS: Tire Pressure Monitoring System) built in the wheels 604 and 605.

Although the series hybrid vehicle has been described above as an example, the present invention can be also applied to a parallel system in which an engine and a motor are used in combination or a hybrid vehicle in which a series system and a parallel system are combined. Furthermore, the present invention can be also applied to electric vehicles (EVs or BEVs) that run on driving by only a driving motor without using any engine, and fuel cell vehicles (FCVs). In addition, the present invention is also applicable to an electric bicycle.

DESCRIPTION OF REFERENCE SYMBOLS

10: Battery pack
30, 40: Battery unit
31, 32, 41, 42: Battery block
35, 45: Control IC
38, 48: Heater fuse
38C, 48C: Heater
73: Charge/discharge control switch
TA: Positive electrode terminal of battery pack
TB: Negative electrode terminal of battery pack
T1, T3: Positive electrode terminal of battery unit
T2, T4: Negative electrode terminal of battery unit

The invention claimed is:

1. A battery pack comprising:
 a battery section;
 a pair of output terminals;
 a control unit; and
 a plurality of battery units, wherein
 each of the plurality of battery units includes a plurality of battery blocks connected in series, a positive electrode terminal, and a negative electrode terminal,
 the battery block includes one battery or a plurality of batteries connected in parallel,
 the battery section includes two battery units,
 a fuse is connected between at least one output terminal of the pair of output terminals and a positive electrode terminal or a negative electrode terminal corresponding to the one output terminal, and
 the fuse is allowed to be fused by the control unit.

2. The battery pack according to claim 1,
 wherein the fuse is a heater fuse, and
 the control unit controls a current to the heater to allow the fuse to be fused.

3. The battery pack according to claim 2, wherein the control unit determines a state of each of the plurality of battery blocks, and controls a current to the heater, based on the determined state.

4. The battery pack according to claim 3, wherein the control unit determines whether each of the plurality of battery blocks is in an overcharged state or not, and controls a current to the heater of the fuse connected in series with the battery block in the overcharged state.

5. The battery pack according to claim 1, wherein
 a first battery unit and a second battery unit are connected in parallel, and
 the fuse is connected to each of a positive electrode terminal of the first battery unit and a positive electrode terminal of the second battery unit, or to each of a negative electrode terminal of the first battery unit and a negative electrode terminal of the second battery unit.

6. The battery pack according to claim 1, comprising a plurality of the control units,
 wherein the control units are connected to each of the plurality of battery units.

7. The battery pack according to claim 1, wherein connection midpoints of the battery blocks in each of the different battery units within the battery section are connected to each other via another fuse that is different from the fuse.

8. The battery pack according to claim 1, wherein a charge/discharge control switch is connected in series between one of the pair of output terminals and the fuse.

9. An electric vehicle comprising the battery pack according to claim 1.

10. The battery pack according to claim 1, comprising a plurality of battery sections, each of which includes a first battery unit and a second battery unit.

* * * * *